United States Patent
Wada et al.

(10) Patent No.: US 7,041,273 B2
(45) Date of Patent: May 9, 2006

(54) APPARATUS AND METHOD OF GENERATING A CARBURIZING ATMOSPHERE

(75) Inventors: Tomohiro Wada, Tokyo-to (JP); Hiroshi Kubo, Tokyo-to (JP); Hidetoshi Ohta, Tokyo-to (JP)

(73) Assignee: Koyo Thermo Systems Co., Ltd., (JP)

( * ) Notice: Subject to any disclaimer, the term of this patent is extended or adjusted under 35 U.S.C. 154(b) by 296 days.

(21) Appl. No.: 10/440,119

(22) Filed: May 19, 2003

(65) Prior Publication Data

US 2003/0217511 A1 Nov. 27, 2003

(30) Foreign Application Priority Data

May 22, 2002 (JP) ............................. 2002-148169

(51) Int. Cl.
*C01B 3/26* (2006.01)
*B01J 10/00* (2006.01)
*B01J 8/04* (2006.01)

(52) U.S. Cl. ..................... 423/651; 422/194; 422/190; 48/116; 48/198.7

(58) Field of Classification Search ................. 48/116, 48/127.9, 198.3, 198.7; 252/373; 422/188, 422/189, 190, 194; 423/651
See application file for complete search history.

(56) References Cited

U.S. PATENT DOCUMENTS 4,618,451 A * 10/1986 Gent ......................... 252/373

* cited by examiner

*Primary Examiner*—Colleen P. Cooke
(74) *Attorney, Agent, or Firm*—Rader, Fishman & Grauer PLLC

(57) ABSTRACT

An apparatus and method of generating a carburizing atmosphere stably generate a reformed gas containing carbon monoxide of high concentration that is suitably used as a carburizing atmosphere. A first reforming furnace and a second reforming furnace are connected in series. A first cooler that removes moisture in an intermediate reformed gas from the first reforming furnace and a hydrocarbon adding section that adds hydrocarbon to the intermediate reformed gas are disposed between the first and second reforming furnaces. A raw material mixed gas with a low mixture ratio of hydrocarbon is introduced into the first reforming furnace to cause a catalytic reaction, thereby generating the intermediate reformed gas. Moisture contained in the intermediate reformed gas is removed. Hydrocarbon is added to the intermediate reformed gas. The intermediate reformed gas is introduced into the second reforming furnace to cause a catalytic reaction, to generate a carburizing atmosphere.

2 Claims, 1 Drawing Sheet

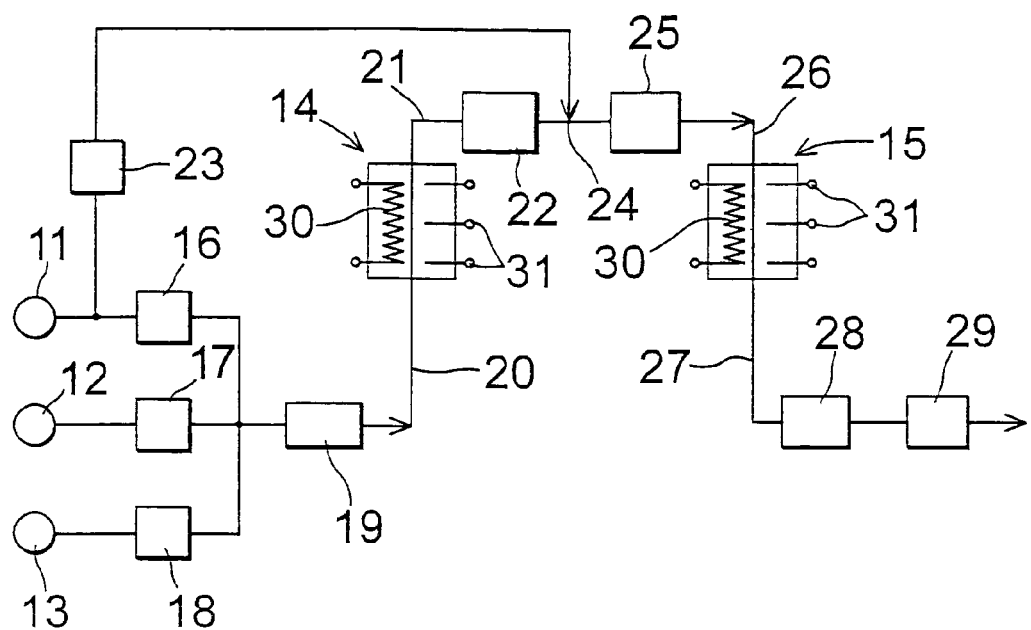

APPARATUS AND METHOD OF GENERATING A CARBURIZING ATMOSPHERE

BACKGROUND OF THE INVENTION

The present invention relates to an apparatus and a method of generating a carburizing atmosphere, and more particularly to an apparatus and a method which can generate a carburizing atmosphere having a composition that allows a carburizing treatment to be effectively performed on steel components and the like.

The air mixing method is widely used as a method of generating a carburizing atmosphere containing carbon monoxide and hydrogen. In the air mixing method, paraffin hydrocarbon such as LNG or LPG is mixed with the air, and the mixed gas (raw material mixed gas) is introduced into a reforming furnace having a nickel catalyst bed which is held at a high temperature. A catalytic reaction (reforming reaction) of oxygen in the air with hydrocarbon is performed, so as to obtain a reformed gas containing carbon monoxide and hydrogen.

In the air used as an oxygen source, however, about 79% nitrogen (vol. %, the same shall apply hereinafter) exists. Therefore, the concentrations of carbon monoxide and hydrogen in the obtained reformed gas cannot be increased to be equal to or higher than a certain degree. In the case of using methane, for example, the maximum concentration of carbon monoxide is 20%, and, in the case of using butane, the maximum concentration is 23.5%.

On the other hand, in the carburizing treatment, particularly in the high-temperature rapid carburizing treatment, if the concentration of carbon monoxide is low, a stable carburizing atmosphere cannot be attained in the carburizing furnace, because of gas equilibrium at a high temperature. For this reason, the concentration of carbon monoxide in the atmosphere is required to be high. Such a high concentration of carbon monoxide can attain the following advantages. In the case where a component having a hole is subjected to the carburizing treatment, for example, the whole interior of the hole can be sufficiently uniformly carburized. In the case where minute components which are piled up and carried on a belt conveyor are subjected to the carburizing treatment, the piling-up height of the components on the belt can be increased.

As a method of increasing the concentration of carbon monoxide in a reformed gas, known is a method in which carbon dioxide or oxygen is used instead of the air as a source gas that is to be mixed with hydrocarbon. Theoretically, when a reforming reaction is performed with the mole ratio of methane to oxygen of 2:1, 2 moles of carbon monoxide and 4 moles of hydrogen are generated. Thus, a reformed gas in which the concentration of carbon monoxide is about 33.3% and that of hydrogen is about 66.7% is obtained. Similarly, when the reaction is performed with the mole ratio of methane to carbon dioxide of 1:1, 2 moles of carbon monoxide and 2 moles of hydrogen are generated, so that their concentrations are 50%, respectively. In the case of butane, as a result of the reaction with 2 moles of oxygen, 4 moles of carbon monoxide and 5 moles of hydrogen are generated, and, as a result of the reaction with 4 moles of carbon dioxide, 8 moles of carbon monoxide and 5 moles of hydrogen are generated.

When carbon monoxide of high concentration is to be generated by using carbon dioxide or oxygen, however, soot which is generated in the reforming furnace causes a serious problem. When carbon dioxide is used as a source gas, for example, the supply of heat from a heater which heats the nickel catalyst bed to a predetermined temperature is partly insufficient, because the reforming reaction is an endothermic reaction. If temperature reduction occurs in part of the nickel catalyst bed, the reaction does not sufficiently proceed in the part, and soot is generated. Also when the concentration of carbon dioxide in the generated gas is low, soot is generated because of the gas equilibrium of carbon monoxide and carbon dioxide. The generation of a large amount of soot in the reforming furnace causes the nickel catalyst bed to be clogged, so that the apparatus cannot be further operated.

On the other hand, in the case where oxygen is used, since the reforming reaction is an exothermic reaction, the problem related to the generation of soot caused by the temperature reduction does not occur. However, the temperature in the reforming furnace is extraordinarily raised because of the exothermic reaction of hydrocarbon with oxygen, thereby causing the possibility that the structural members are softened and deformed and the apparatus malfunctions, or that part of members is molten. Thus, there arise problems in safety.

As a result, although it is known that a reformed gas containing carbon monoxide of high concentration can be obtained by using carbon dioxide or oxygen as a source gas instead of the air, a conventional addition method in which, placing emphasis on the safety and stability, the air is used as the source gas is still adopted in an actual apparatus.

SUMMARY OF THE INVENTION

It is an object of the invention to provide an apparatus and a method of generating a carburizing atmosphere which can stably generate a reformed gas containing carbon monoxide of high concentration that is suitably used as a carburizing atmosphere.

In order to attain the object, the apparatus for generating a carburizing atmosphere of the invention is an apparatus in which a raw material mixed gas that is a mixture of hydrocarbon and a source gas of carbon dioxide or oxygen is introduced into a reforming furnace having a catalyst bed, and a carburizing atmosphere containing carbon monoxide and hydrogen is generated by a catalytic reaction, wherein a first reforming furnace and a second reforming furnace which are connected in series are disposed as the reforming furnace, and moisture removing means for removing moisture in an intermediate reformed gas which is led out from the first reforming furnace and to be introduced into the second reforming furnace, and a hydrocarbon adding section which adds hydrocarbon to the intermediate reformed gas are disposed in a passage between the first and second reforming furnaces.

The method of generating a carburizing atmosphere of the invention is a method in which a raw material mixed gas that is a mixture of hydrocarbon and a source gas of carbon dioxide or oxygen is introduced into a reforming furnace having a catalyst bed, and a carburizing atmosphere containing carbon monoxide and hydrogen is generated by a catalytic reaction, wherein the raw material mixed gas in a condition where a mixture ratio of hydrocarbon is low is introduced into a first reforming furnace to cause a catalytic reaction, thereby generating an intermediate reformed gas, moisture contained in the intermediate reformed gas is then removed, hydrocarbon is added to the intermediate reformed gas, and the intermediate reformed gas is then introduced into a second reforming furnace to cause a catalytic reaction, thereby generating a carburizing atmosphere.

In the invention, the above-mentioned source gas of carbon dioxide or oxygen includes carbon dioxide only, oxygen only, and a mixed gas of carbon dioxide and oxygen, and also a gas in which nitrogen serving as a dilution gas is mixed with them.

BRIEF DESCRIPTION OF THE DRAWING

The FIGURE is a system diagram showing an embodiment of an apparatus for generating a carburizing atmosphere of the invention.

DETAILED DESCRIPTION OF THE PREFERRED EMBODIMENTS

The FIGURE is a system diagram showing an embodiment of an apparatus for generating a carburizing atmosphere of the invention. In the carburizing atmosphere generating apparatus, hydrocarbon as a raw material, and carbon dioxide and oxygen as a source gas which is to be mixed with the hydrocarbon are used. The carburizing atmosphere generating apparatus comprises: a hydrocarbon supply source 11; a carbon dioxide supply source 12; an oxygen supply source 13; first and second reforming furnaces 14 and 15 each having a catalyst bed such as a nickel catalyst bed; a first gas mixer 19 for mixing a predetermined amount of hydrocarbon supplied from the hydrocarbon supply source 11 via a first hydrocarbon flow regulator 16, a predetermined amount of carbon dioxide supplied from the carbon dioxide supply source 12 via a carbon dioxide flow regulator 17, and a predetermined amount of oxygen supplied from the oxygen supply source 13 via an oxygen flow regulator 18; a raw material mixed gas introducing passage 20 for introducing the raw material mixed gas which is obtained by the mixture in the first gas mixer 19, into the first reforming furnace 14; a first cooler 22 which serves as moisture removing means, and which is disposed in an intermediate reformed gas leading-out passage 21 through which an intermediate reformed gas containing carbon monoxide and hydrogen generated by a catalytic reaction in the first reforming furnace 14 is led out; a hydrocarbon adding section 24 which adds hydrocarbon supplied from the hydrocarbon supply source 11 via a second hydrocarbon flow regulator 23, to the intermediate reformed gas; a second gas mixer 25 which mixes the hydrocarbon added from the hydrocarbon adding section 24 with the intermediate reformed gas; a mixed gas introducing passage 26 through which the mixed gas mixed in the second gas mixer 25 is introduced into the second reforming furnace 15; a second cooler 28 which is disposed in a carburizing atmosphere leading-out passage 27 for leading out a reformed gas (a carburizing atmosphere) containing carbon monoxide and hydrogen generated by the catalytic reaction in the second reforming furnace 15; and a gas analyzer 29 which analyzes the carburizing atmosphere cooled in the second cooler 28. Each of the first reforming furnace 14 and the second reforming furnace 15 is provided with a heater 30 for heating the nickel catalyst bed to a predetermined temperature, and a thermometer 31. The nickel catalyst beds in the reforming furnaces 14 and 15 are heated to 1,000 to 1,100° C. and usually to 1,050° C.

First, a raw material mixed gas in which the mixture ratio of hydrocarbon is set to be lower than that in the case of a usual single-stage reforming furnace is introduced into the first reforming furnace 14. As a result, the reaction of oxygen with hydrocarbon in an initial reaction stage (combustion exothermic reaction) can be suppressed to be low as compared with the prior art, so that the temperature rise in the first reforming furnace 14 can be suppressed. Since the catalytic reaction is performed in a condition where carbon dioxide and oxygen are richer than hydrocarbon, the amount of carbon dioxide in the generated intermediate reformed gas can be made larger than that in a carburizing atmosphere which is generated by a single-stage reforming furnace. In other words, the generation of soot which is caused in the case where the concentration of carbon dioxide in the generated gas is low because of the gas equilibrium of carbon monoxide and carbon dioxide can be suppressed by increasing the concentration of carbon dioxide.

The mixture amount of hydrocarbon in the raw material mixed gas is varied depending on the amounts of carbon dioxide and oxygen. Generally, the mixture amount is set so that the mixture ratio of carbon monoxide to carbon dioxide in the intermediate reformed gas is in an appropriate range. In the case where the concentration of carbon monoxide is 37%, for example, the concentration of carbon dioxide is preferably set to the range of 3 to 5%, and, in the case where the concentration of carbon monoxide is 50%, the concentration of carbon dioxide is preferably set to the range of 6 to 10%. As for the ratio of carbon monoxide to carbon dioxide in the intermediate reformed gas, a numeric value obtained by squaring the amount of carbon monoxide, and the amount of carbon dioxide exhibit a proportional relationship. When the amount of carbon monoxide is increased to 1.4 times, therefore, a suitable amount of carbon dioxide is increased to about 2 times.

At this time, the generation of soot can be surely suppressed by increasing the amount of carbon dioxide in the intermediate reformed gas. When a large amount of carbon dioxide exists in the intermediate reformed gas, however, the amount of hydrocarbon required for converting the carbon dioxide into carbon monoxide is increased, and hence the load of the second reforming furnace 15 is disadvantageously increased.

The intermediate reformed gas led out from the first reforming furnace 14 contains moisture (vapor) which is generated by the reaction of hydrogen in the hydrocarbon with oxygen in the source gas or oxygen generated by decomposition of carbon dioxide. The presence of moisture increases the concentration of carbon dioxide because of the relationship of gas equilibrium. As a result, the efficiency in the second reforming furnace 15 in the subsequent step is lowered.

The intermediate reformed gas led out from the first reforming furnace 14 is introduced into the first cooler 22 disposed in the intermediate reformed gas leading-out passage 21 to be rapidly cooled, and the moisture is removed so that the dew point is 20° C. or lower, and preferably 10° C. or lower. As the first cooler 22, an indirect heat exchanger of water-cooling type having a draining function can be used. When the intermediate reformed gas is cooled in the indirect heat exchanger, the moisture in the intermediate reformed gas can be condensed and removed away due to the difference in saturated vapor pressure. If the intermediate reformed gas is gradually cooled, soot may be generated to block the passage of the gas. Thus, it is preferable that an indirect heat exchanger having a large heat-transfer surface is used so as to sufficiently enhance the cooling rate. Alternatively, it is possible to use both a cooler and a drain separator, or other dehydrating means may be used singly or in combination.

In the hydrocarbon adding section 24, a small amount of hydrocarbon is added to the intermediate reformed gas from which moisture has been removed. The adding amount of hydrocarbon is required only to be sufficient for converting excessive carbon dioxide in the intermediate reformed gas into carbon monoxide, and may be set so that the carbon potential (Cp) in the reformed gas (carburizing atmosphere) which is eventually generated has a desired value.

The intermediate reformed gas to which hydrocarbon has been added is sufficiently mixed in the second gas mixer 25, and then introduced into the second reforming furnace 15 through the mixed gas introducing passage 26. In the second reforming furnace 15, decomposition of hydrocarbon and reaction of carbon or hydrogen generated by the decomposition with carbon dioxide mainly progress. These reactions are endothermic reactions, so that the second reforming furnace 15 is not in an excessively heated condition. In addition, since the amount of hydrocarbon is small, soot is hardly generated. Moreover, moisture is removed before the gas is introduced into the second reforming furnace 15, and hence the reaction is substantially free from influence by moisture. Thus, the decomposition of carbon dioxide can be efficiently performed. Accordingly, a reformed gas which has an optimum composition as a carburizing atmosphere, or in which the concentration of carbon monoxide is sufficiently high and that of carbon dioxide is sufficiently low can be obtained.

The carburizing atmosphere which is led out from the second reforming furnace 15 to the carburizing atmosphere leading-out passage 27 is rapidly cooled in the second cooler 28, and then supplied to a carburizing furnace or the like. The amounts of carbon dioxide and oxygen in the carburizing atmosphere are analyzed by the gas analyzer 29. Based on the analyzed values, the second hydrocarbon flow regulator 23 is operated to adjust the amount of hydrocarbon which is to be added to the intermediate reformed gas. Therefore, the reaction in the second reforming furnace 15 can be suppressed to an optimum condition, and the carburizing atmosphere having a desired value of Cp can be efficiently obtained.

As described above, in the first reforming furnace 14, the amount of hydrocarbon in the material mixed gas is set to be small so as to suppress the temperature rise and the generation of soot in the furnace, and, in the second reforming furnace 15, a small amount of hydrocarbon is added to the intermediate reformed gas from which moisture has been removed away, to convert excessive carbon dioxide into carbon monoxide. Therefore, a desired carburizing atmosphere can be obtained at a high efficiency in a stable condition while the generation of soot is prevented from occurring as a whole.

The concentration of carbon monoxide, the concentration of hydrogen, and the value of Cp in the carburizing atmosphere can be arbitrarily determined in a certain range by appropriately selecting the kind of hydrocarbon to be employed as a raw material. In order to suppress the temperature rise in the first reforming furnace 14, an inert gas such as nitrogen may be added to the raw material mixed gas. Since the reaction in the second reforming furnace 15 is the endothermic reaction, a preheater for preheating the intermediate reformed gas after the addition of hydrocarbon to the self-decomposition temperature of hydrocarbon or lower may be preferably disposed in a preceding stage of the second reforming furnace 15. Even when only oxygen (nitrogen may be contained) is used instead of the use of carbon dioxide as a source gas, the amount of carbon dioxide in the intermediate reformed gas led out from the first reforming furnace 14 can be increased by appropriately setting the mixing ratio and reaction conditions, so that the generation of soot can be suppressed.

As described above, according to the invention, the first and second reforming furnaces are connected in series, an intermediate reformed gas containing carbon monoxide of high concentration and carbon dioxide of high concentration is generated in the first reforming furnace, hydrocarbon is added after moisture in the intermediate reformed gas is removed away, and a reforming reaction for removing excessive carbon dioxide by using the hydrocarbon is performed in the second reforming furnace, so that the generation of soot is suppressed and hence the clogging of a catalyst bed can be prevented from occurring. Therefore, a carburizing atmosphere containing carbon monoxide of high concentration, particularly, a reformed gas which has an optimum composition as a carburizing atmosphere in high-temperature rapid carburizing treatment can be stably generated for a long time.

What is claimed is:

1. An apparatus for generating a carburizing atmosphere in which a raw material mixed gas that is a mixture of hydrocarbon and a source gas of carbon dioxide or oxygen is introduced into a reforming furnace having a catalyst bed, and a carburizing atmosphere containing carbon monoxide and hydrogen is generated by a catalytic reaction, wherein a first reforming furnace and a second reforming furnace which are connected in series are disposed as said reforming furnace, and moisture removing means for removing moisture in an intermediate reformed gas which is led out from said first reforming furnace and to be introduced into said second reforming furnace, and a hydrocarbon adding section which adds hydrocarbon to the intermediate reformed gas are disposed in a passage between said first and second reforming furnaces.

2. A method of generating a carburizing atmosphere in which a raw material mixed gas that is a mixture of hydrocarbon and a source gas of carbon dioxide or oxygen is introduced into a reforming furnace having a catalyst bed, and a carburizing atmosphere containing carbon monoxide and hydrogen is generated by a catalytic reaction, wherein said raw material mixed gas in a condition where a mixture ratio of hydrocarbon is low is introduced into a first reforming furnace to cause a catalytic reaction, thereby generating an intermediate reformed gas, moisture contained in said intermediate reformed gas is then removed, hydrocarbon is added to said intermediate reformed gas, and said intermediate reformed gas is then introduced into a second reforming furnace to cause a catalytic reaction, thereby generating a carburizing atmosphere.

* * * * *